(12) United States Patent
Meli et al.

(10) Patent No.: US 7,809,268 B2
(45) Date of Patent: Oct. 5, 2010

(54) INTEGRATED OPTICAL SERVICE CHANNEL AND QUANTUM KEY DISTRIBUTION CHANNEL

(75) Inventors: Fausto Meli, Piacenza (IT); Gabriele Maria Galimberti, Bovisio Masciago (IT)

(73) Assignee: Cisco Technology, Inc., San Jose, CA (US)

( * ) Notice: Subject to any disclaimer, the term of this patent is extended or adjusted under 35 U.S.C. 154(b) by 1168 days.

(21) Appl. No.: 11/276,742

(22) Filed: Mar. 13, 2006

(65) Prior Publication Data

US 2007/0212063 A1 Sep. 13, 2007

(51) Int. Cl.
*H04J 14/02* (2006.01)

(52) U.S. Cl. .............................. 398/79; 398/59; 398/83; 398/151; 398/30; 398/89; 380/256; 380/278

(58) Field of Classification Search ................. 398/141, 398/154, 151, 79, 82, 84, 85, 182, 202, 181, 398/177, 30, 31, 33, 89, 68, 83, 59, 69, 70, 398/71, 72, 98, 99, 100; 380/256, 263, 255, 380/278

See application file for complete search history.

(56) References Cited

U.S. PATENT DOCUMENTS

| 7,437,081 | B2 * | 10/2008 | Mitchell et al. | 398/154 |
| 2003/0002674 | A1 * | 1/2003 | Nambu et al. | 380/256 |
| 2005/0180575 | A1 * | 8/2005 | Maeda et al. | 380/278 |
| 2006/0045527 | A1 * | 3/2006 | Maeda et al. | 398/79 |
| 2006/0093376 | A1 * | 5/2006 | Mitchell et al. | 398/183 |
| 2007/0065155 | A1 * | 3/2007 | Luo et al. | 398/141 |
| 2007/0076884 | A1 * | 4/2007 | Wellbrock et al. | 380/263 |
| 2007/0110241 | A1 * | 5/2007 | Trifonov et al. | 380/255 |

* cited by examiner

*Primary Examiner*—Hanh Phan

(57) ABSTRACT

A method for integrating an Optical Service Channel (OSC) with a Quantum Key Distribution (QKD) channel across a DWDM network having a single mode optical fiber is provided. An optical signal is received. An OSC is coupled with the optical signal. A QKD channel is integrated with the OSC on the single mode optical fiber.

11 Claims, 6 Drawing Sheets

INTEGRATED OPTICAL SERVICE CHANNEL AND QUANTUM KEY DISTRIBUTION CHANNEL

FIELD OF THE INVENTION

The present invention relates to electronic network communications systems. More particularly, the present invention relates to integrated optical service channel and quantum key distribution channel.

BACKGROUND OF THE INVENTION

Cryptography is the art to exchange information between a sender ("Alice") and a receiver ("Bob"), rendering it unintelligible to any other person. A readable text is encrypted with a secret key through an algorithm by Alice and then sent to Bob that can recover the plain text using a decryption algorithm and the secret key. The "key distribution problem" is fundamental in information exchange security. This problem has been solved by "public key cryptography" based on one-way functions. However, even if reversing one-way functions is an extremely time consuming task, future computers could become fast enough to crack the key in a reasonable time or mathematics progress could find the existence of algorithms that allow reversing one-way functions. Security of key transmission depends on: key length, key change frequency and method to protect key exchange (true random numbers generation and chance for an intruder, "Eve", to intercept the key).

Quantum Key Distribution (QKD) is one way to solve this problem having Heisenberg's uncertainty principle as guarantee. In QKD encoding of each bit ("qubit") is done on the property of a photon (e.g. polarization, phase): any tentative by Eve to intercept bits of the key will cause perturbation and errors in the sequence of bits, detected by Alice and Bob. So "a posteriori", only if the key has not been intercepted can be validated to encrypt data (e.g. monitoring BER change compared to a reference). QKD and quantum (true) random numbers generation with key refresh rate, at least, once per second make truly secure data encryption. QKD doesn't want to replace existing encryption technologies (e.g. SSL, Public Key Infrastructure), but is applied mainly as combination of QKD and classical data encryption to ensure, if needed, a totally safe information exchange. Main applications could be: financial information and trading exchange, Storage Area Networks, Point-to-point links with extremely high security level.

Players in QKD field are mainly focused to solve the problem of the single photon or weak light pulses transmission/detection technology and how to carve "qubits" on photons in a stable and reliable way. However, existing QKD structures do not consider integration in optical systems architectures (e.g. DWDM systems). In DWDM optical systems, the Optical Service Channel (OSC) is usually designed for span-by-span transmission of service information between any two adjacent sites.

Others have developed structures based on quasi-single photon transmission/detection where, as example, the key distribution is accomplished through an optical distributed Mach-Zender circuit adopting: a single wavelength bi-directional configuration or a mono-directional configuration operating at 1300 nm (reference clock laser) and 1550 nm wavelengths. However, these solutions use a second optical fiber for real traffic channels due to optical crosstalk problem over the quantum channel operating at very low power.

Therefore, a need exists for a method for integrating OSC and QKD onto one optical fiber to optimize performance (i.e. reducing the impact of real traffic optical channels crosstalk on quantum key distribution channel) and to reduce costs (e.g. using one optical fiber for traffic and key distribution). A primary purpose of the present invention is to solve these needs and provide further, related advantages.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of an integrated optical service channel and quantum key distribution channel. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hard-wired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Figure 1A:
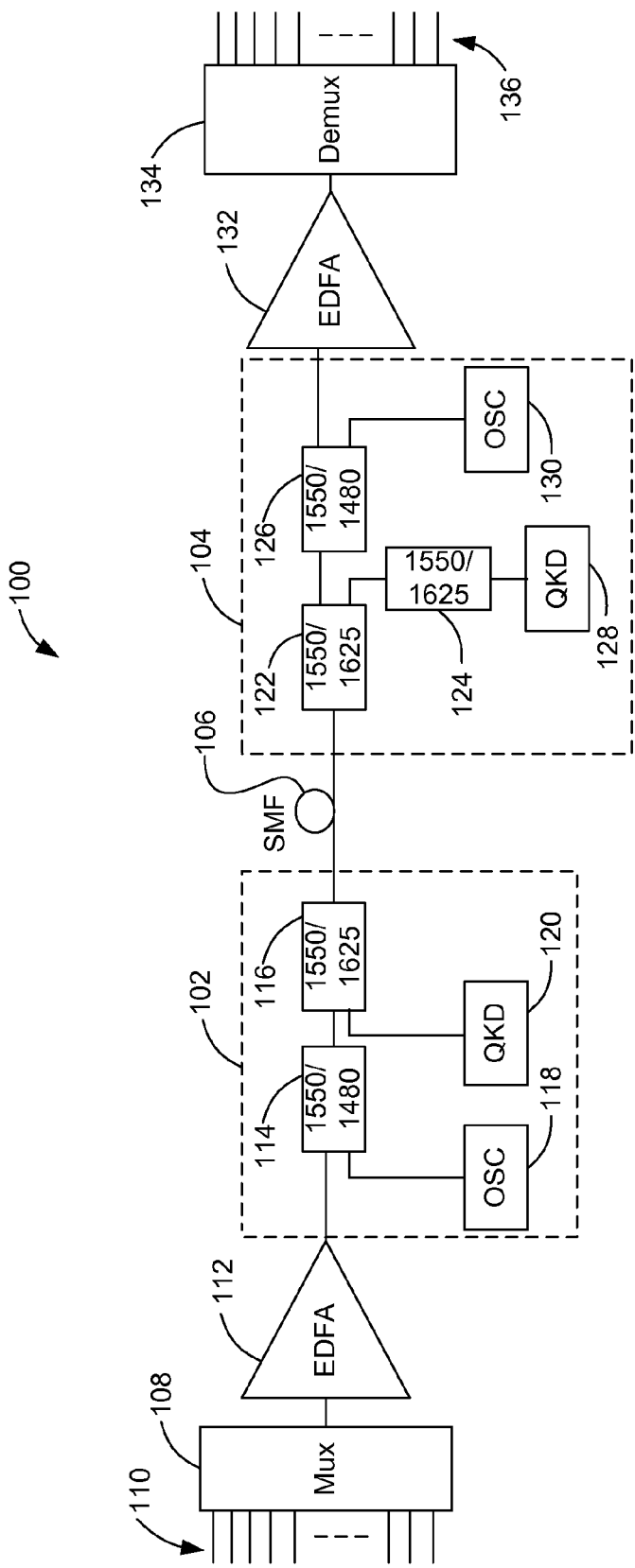
FIG. 1A is a block diagram schematically illustrating a DWDM optical network having an integrated optical service channel (OSC) and Quantum Key Distribution (QKD) channel including WDM optical couplers in accordance with one embodiment.

FIG. 1A is a block diagram schematically illustrating a DWDM optical network 100 having an integrated optical service channel (OSC) and Quantum Key Distribution (QKD) channel in accordance with one embodiment. The network 100 includes a transmitting device 102 coupled to a receiving device 104 with a single mode optical fiber 106.

A multiplexer 108 combines one or more channels 110 into an optical signal. A first amplifier 112, such as an Erbium Doped Fiber Amplifier, amplifies the combined optical signal and feeds the amplified optical signal to the transmitting device 102.

The transmitting device 102 includes a first WDM optical coupler 114, a second WDM optical coupler 116, an OSC transmitter 118, and a QKD transmitter 120. The first WDM optical coupler 114 includes two inputs: a first input connected to the amplifier 112, and a second input connected to the OSC transmitter 118. The second WDM optical coupler 116 includes two inputs: a first input connected to an output of the first WDM optical coupler 114, and a second input connected to the QKD transmitter 120. The output of the second WDM optical coupler 116 is connected to the single mode optical fiber 106.

For illustration purposes, the first WDM optical coupler 114 may operate, for example, at 1550/1480 nm. The second WDM optical coupler 116 may operate, for example, at 1550/1625 nm. The OSC transmitter 118 may use a laser having, for example, a wavelength of 1510 nm. This wavelength depends mainly on DWDM channels allocation and on span budget allocated for service channel. Examples of other wavelengths that can be used include, but are not limited to, 1310 nm and 1480 nm. The OSC transmitter 118 can also be used to carry reference clock for mono-directional QKD configuration.

In the example of FIG. 1A, QKD transmitter 120 adds a QKD optical channel at wavelength of 1625 nm. The wavelength at 1625 nm allows a quantum channel span budget optimized due to minimum attenuation in optical fiber spectrum. As a further advantage, this wavelength reduces the impact of residual light (optical isolation of 30-40 dB per filter) coming from OSC and DWDM channels.

The first WDM optical coupler 114 and the second WDM optical coupler 116 are added between the OSC transmitter 118 and the QKD transmitter 120 to separate QKD channel from DWDM channels.

The receiving device 104 includes a first WDM optical coupler 122, a second WDM optical coupler 124, a third WDM optical coupler 126, a QKD receiver 128, and an OSC receiver 130. An input of the first WDM optical coupler 122 is connected to the single mode optical fiber 106. The second WDM optical coupler 124 is connected in cascade with the first WDM optical coupler 122 to enhance crosstalk rejection. The third WDM optical coupler 126 is coupled to another output of the first WDM optical coupler 122. The QKD receiver 128 is coupled to the second WDM optical coupler 124. The OSC receiver 130 is connected to a first output of the third WDM optical coupler 126.

A second amplifier 132 is connected to a second output of the third WDM optical coupler 126. The second amplifier 132 amplifies the optical signal out of the third WDM optical coupler 126 and feeds the amplified optical signal into a demultiplexer 134 that demultiplexes the amplified optical signal into one or more channels 136.

Figure 1B:
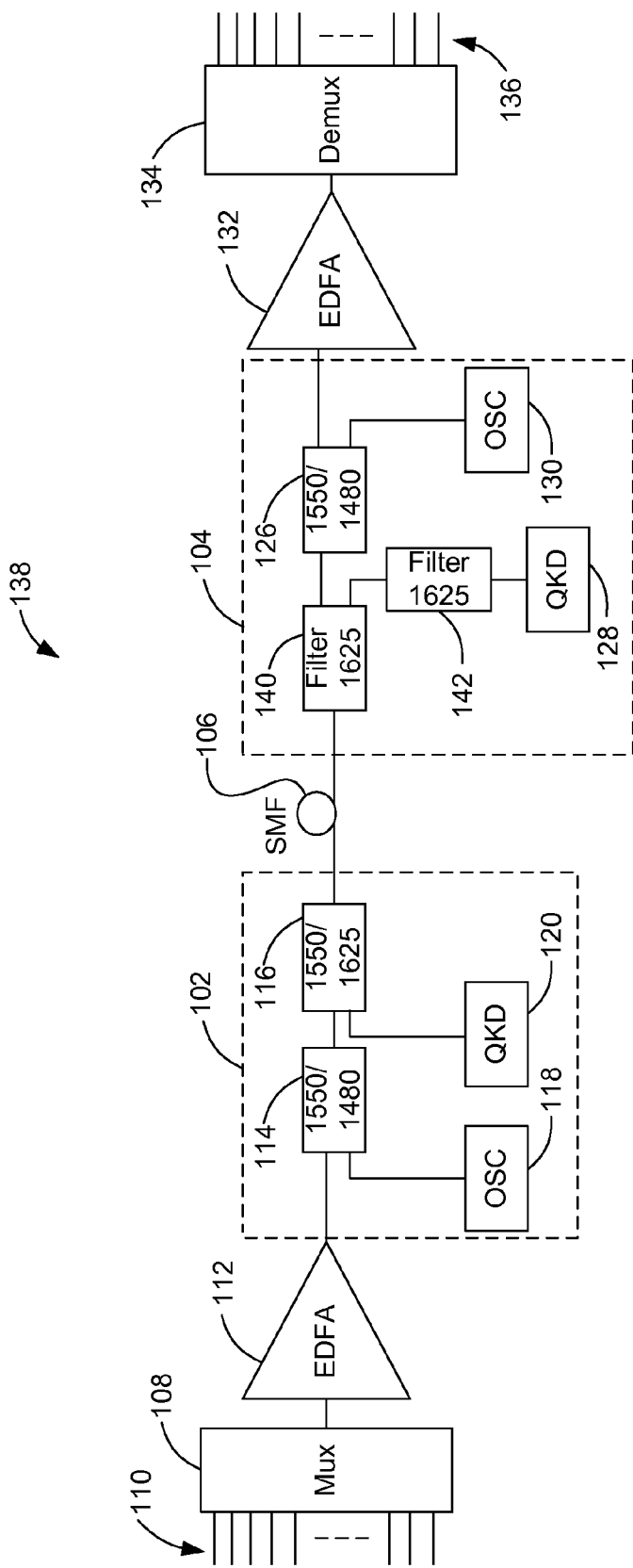
FIG. 1B is a block diagram schematically illustrating a DWDM optical network having an integrated OSC and QKD channel including optical filters and a DFB laser in accordance with another embodiment.

FIG. 1B is a block diagram schematically illustrating a DWDM optical network 138 having an integrated OSC and QKD channels in accordance with another embodiment. The transmitting device 102 includes a QKD transmitter 120 driven by a DFB cooled laser (not shown). At the receiving device 104, a cascade of two or more filters, such as filters 140 and 142 with 1625 nm optical pass band filter, filters the optical signal received from the single mode optical fiber 106 resulting in an optical isolation of at least 50 dB per filter, and hence a more reliable crosstalk rejection.

Figure 2:
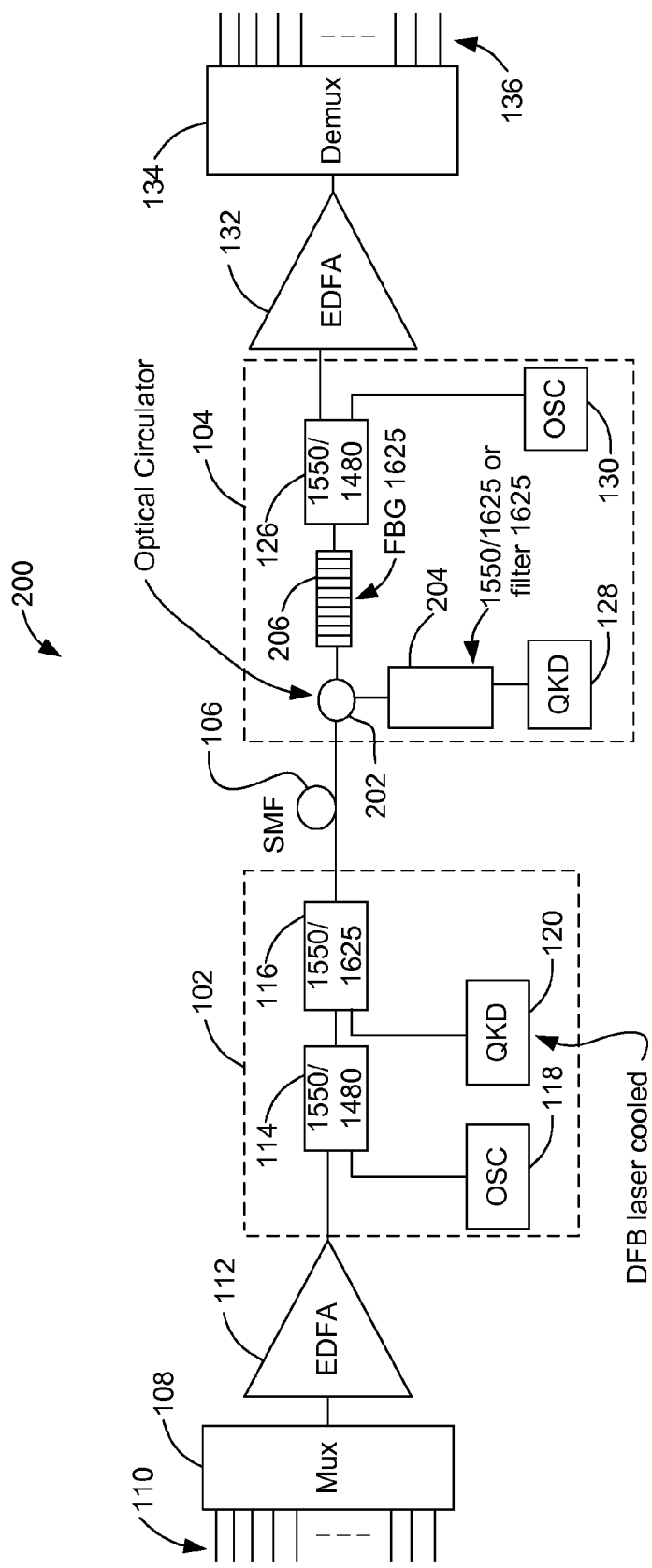
FIG. 2 is a block diagram schematically illustrating a DWDM optical network having an integrated OSC and QKD channel using a Fiber Bragg grating (FBG) and an optical circulator in accordance with one embodiment.

FIG. 2 is a block diagram schematically illustrating a DWDM optical network 200 having an integrated OSC and QKD channel using a Fiber Bragg grating (FBG) and an optical circulator in accordance with one embodiment. The receiving device 104 includes an optical circulator 202 having three ports: a first port connected to the single mode optical fiber 106, a second port connected to a filter/coupler 204, a third port connected to a Fiber-Bragg Grating filter 206. The Fiber-Bragg Grating filter 206 is connected to the third WDM optical coupler 126. The QKD receiver 128 is connected to the coupler/filter 204. When the QKD transmitter 120 is driven by a DFB cooled laser, the filter 204 provides a better optical isolation to increase crosstalk rejection. Accordingly, in a preferred embodiment, the QKD receiver 128 is driven by a single mode DFB cooled laser (not shown).

As an example, the single photon transmitter could have a typical emission of 1 photon/pulse, a pulse duration of 800 ps, a pulse repetition frequency of 10 Mhz resulting in an average emitted power of around −88.9 dBm.

QKD is not applicable in multi span optical amplified system (DWDM systems) due to Amplified Spontaneous Emission. So the main application is related to single span where "payload" optical channels are optically amplified at the transmitter side (booster amplifier after optical multiplexer but before OSC and QKD optical channels add) and at the receiver side (pre-amplifier after OSC and QKD channels drop but before optical demultiplexer).

As an example, the DWDM single span system illustrated in FIGS. 1 and 2 could have 32 optical channels with E-FEC (Enhanced Forward Error Correction) receiver. Considering that the QKD system can support typically 20 dB span loss, the total power at booster optical amplifier output could be around 0 dBm. Finally, total optical isolation between QKD 1625 nm optical channel and "payload" optical channels should be at least 100 dB.

Figure 3:
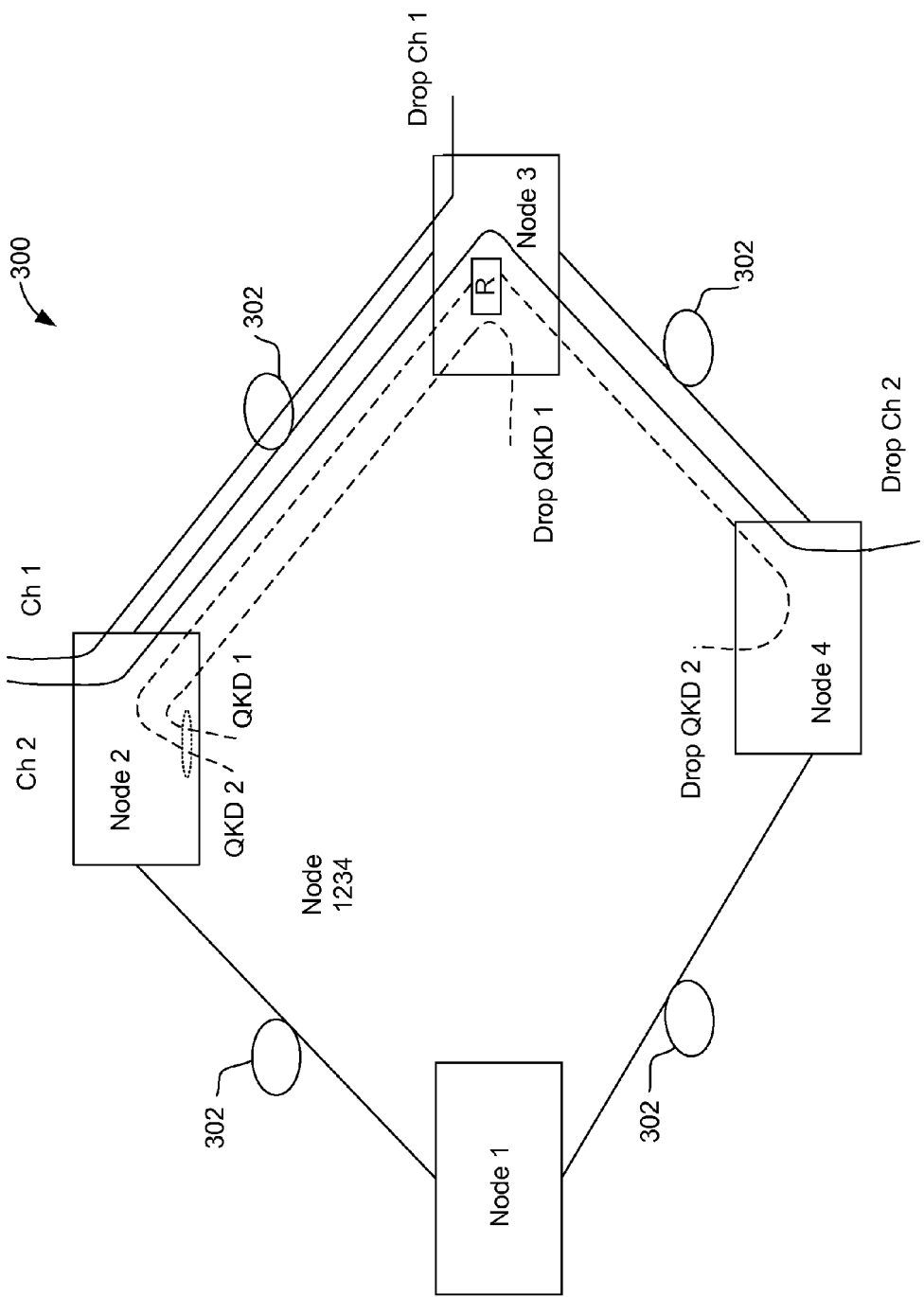
FIG. 3 is a block diagram schematically illustrating a DWDM optical network with QKD channel in accordance with one embodiment.

FIG. 3 is a block diagram schematically illustrating a DWDM optical network 300 with QKD channel in accordance with one embodiment. Nodes 1, 2, 3, and 4, are connected to each other in a loop with an optical fiber 302.

Channels 1 and 2 are transmitted at Node 2 along with QKD 1 and 2 to Node 3. At Node 3, channel 1 and QKD 1 are dropped while QKD 2 is regenerated. The QKD has to be regenerated at each node due to limited reach of QKD and because optical amplification would destroy the key. Channel 2 and QKD 2 are dropped at Node 4.

The DWDM optical network 300 illustrates the advantages of an integrated implementation of QKD in OSC structure to assure high degree of security and lower costs. The use of one optical fiber to transport payload channels and QKD/OSC channels reduces network complexity and costs. Furthermore, regeneration of quantum key at each node allows the support of multi-hop key distribution.

The QKD can still fit with some architectural improvements to common DWDM systems supporting meshed and multi-hop networks. A specific KEY is assigned to any channel (Lambda) and distributed through the OSC. The KEY can contain or can be associated to each specific channel (Lambda). The KEY+Lambda information is generated where the Lambda is originated and forwarded to the adjacent node (via OSC). The receiving node detects the KEY correctness (according to conventional algorithms) and decides whether to use the KEY locally (if the Lambda is terminated) or to forward the KEY to the next node where the Lambda is passed through. This process is repeated until the node terminating the specific Lambda is reached. The KEY privacy is guaranteed by the impossibility to violate the very low level SW of the nodes (firmware).

Thus, QKD can be conveniently applied in single span links and in common DWDM systems supporting multi-span and meshed networks where, using FEC receivers, "payload" optical channels power can be reduced to allow acceptable levels of optical isolation with QKD channel.

Figure 4:
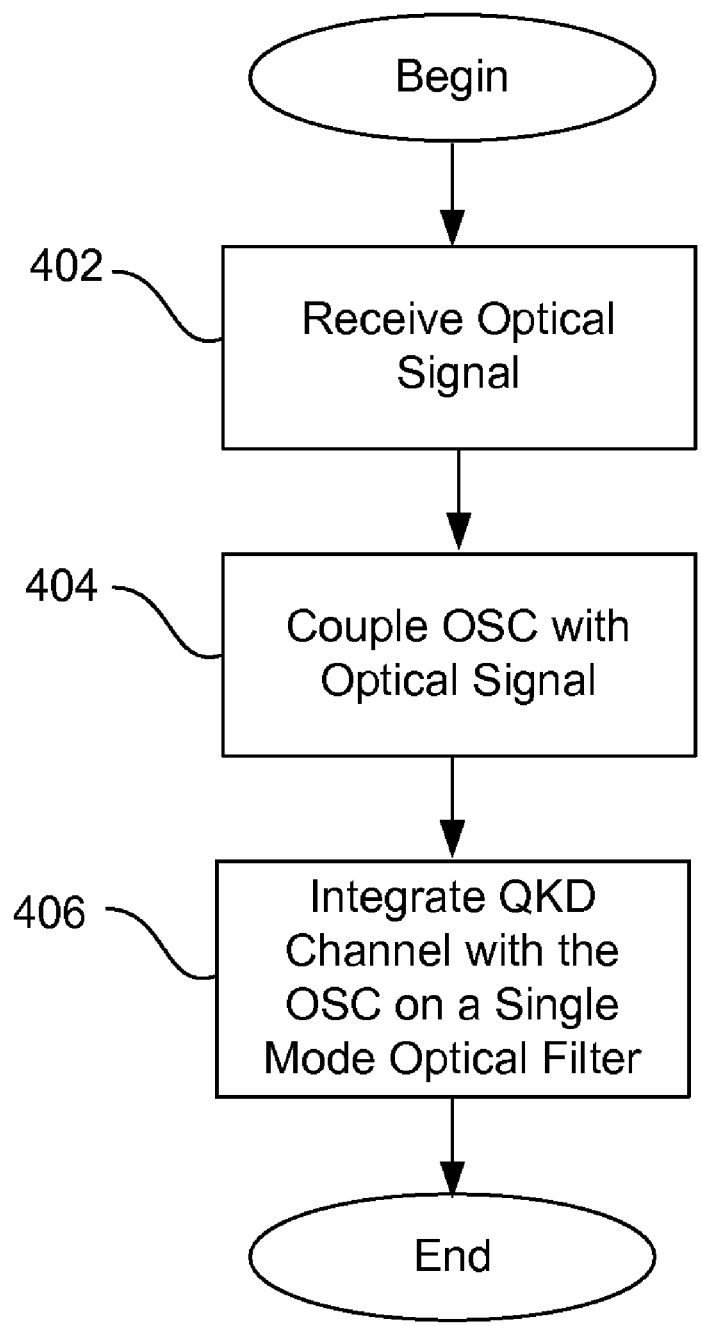
FIG. 4 is a flow diagram schematically illustrating a method for integrating an OSC with a QKD channel on a single optical fiber in accordance with one embodiment.

FIG. 4 is a flow diagram schematically illustrating a method for integrating an OSC with a QKD channel on a single optical fiber in accordance with one embodiment. At 402, an optical signal is received. At 404, the optical signal is coupled to an Optical Service Channel (OSC). At 406, a QKD channel is integrated with the OSC on a single mode optical fiber.

Figure 5:
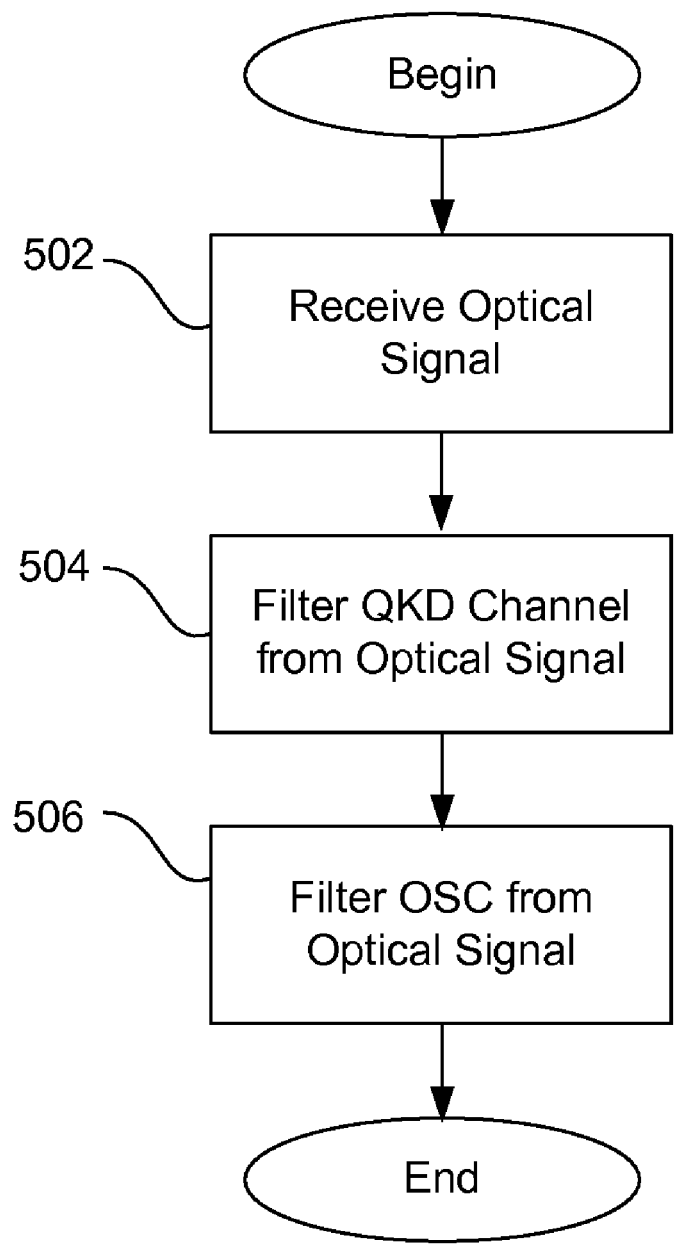
FIG. 5 is a flow diagram schematically illustrating a method for receiving an optical signal on a single mode optical fiber having an OSC and a QKD channel in accordance with one embodiment.

FIG. 5 is a flow diagram schematically illustrating a method for receiving an optical signal on a single mode optical fiber having a combined OSC and QKD channel. At 502, the optical signal having combined OSC and QKD channel is received. At 504, the QKD channel is filtered from the optical signal. At 506, the OSC is filtered from the optical signal.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. An apparatus comprising:
   a first wavelength division (WDM) optical coupler having a first input configured to receive an output of an optical amplifier and a second input configured to receive an output from an optical service channel (OSC) transmitter, and configured to output a first optical signal containing OSC signals produced by the OSC transmitter in a first wavelength channel; and
   a second WDM optical coupler having a first input coupled to the output of the first WDM optical coupler and a second input coupled to an output of a quantum key distribution (QKD) transmitter, and configured to output to a single mode optical fiber the first optical signal in the first wavelength channel and at the same time a second optical signal containing QKD signals produced by the QKD transmitter in a second wavelength channel.

2. The apparatus of claim 1, wherein the QKD transmitter is driven by a distributed feedback cooled laser.

3. A system comprising the apparatus of claim 1, and further comprising a receiver apparatus configured to be coupled to an opposite end of the single mode optical fiber, wherein the receiver apparatus comprises a first WDM optical coupler, a second WDM optical coupler and a third WDM optical coupler, wherein an input of the first WDM optical coupler is configured to be coupled to the opposite end of the single mode optical fiber and an input of the second WDM optical coupler is configured to be coupled to a first output of the first WDM optical coupler and an input of the third WDM optical coupler is coupled to a second output of the first WDM optical coupler, wherein the first and third WDM optical couplers are configured to operate in the second wavelength channel and the first WDM optical coupler is configured to operate in the first wavelength channel, and further comprising a QKD receiver configured to connect to an output of the second WDM optical coupler and an OSC receiver configured to connect to a first output of the third WDM optical coupler, and wherein a second output of the third WDM optical coupler is configured to connect to an optical amplifier.

4. A system comprising the apparatus of claim 1, and further comprising a receiver apparatus configured to be coupled to an opposite end of the single mode optical fiber, wherein the receiver apparatus comprises a first filter, a second filter and a WDM optical coupler, wherein an input of the first filter is configured to be coupled to the opposite end of the single mode optical fiber and an input of the second filter is configured to be coupled to a first output of the first filter and an input of the WDM optical coupler is coupled to a second output of the first filter, wherein the first and second filters have a pass band corresponding to the second wavelength channel and the WDM optical coupler is configured to operate in the first wavelength channel, and further comprising a QKD receiver configured to connect to an output of the second filter and an OSC receiver configured to connect to a first output of the WDM optical coupler, and wherein a second output of the WDM optical coupler is configured to connect to an optical amplifier.

5. A system comprising the apparatus of claim 1, and further comprising a receiver apparatus configured to be coupled to an opposite end of the single mode optical fiber, wherein the receiver apparatus comprises an optical circulator having first, second and third ports, a first optical coupler and a second optical coupler, and a Fiber Bragg grating filter, the first port of the optical circulator being connected to the opposite end of the single mode fiber, the second port of the optical circulator being connected to the first optical coupler and the third port of the optical circulator being connected to the Fiber Bragg grating filter and an input of the second optical coupler being connected to an output of the Fiber Bragg grating filter, and further comprising a QKD receiver configured to connect to an output of the first optical coupler and an OSC receiver configured to connect to a first output of the second optical coupler.

6. An optical network comprising a plurality of nodes, a first node comprising the apparatus of claim 1, wherein the plurality of nodes are connected to each other in a loop with the single mode optical fiber, and wherein the first node is configured to transmit optical signals in the first and second wavelength channels on the optical fiber along with first and second QKD keys to a second one of the plurality of nodes, and the second node drops the first wavelength channel and the first QKD key and regenerates the second QKD key for transmission to a third node in the loop and the third node is configured to drop the second QKD key and the second wavelength channel.

7. The optical network of claim 6, wherein the first node is configured to assign the first and second QKD keys to a corresponding one of the first and second wavelength channels, and the first node is configured to transmit QKD key and wavelength information pertaining the assignment of the QKD keys to wavelength channels in an OSC via the OSC transmitter, and wherein the second node receives the QKD key and wavelength information, evaluates the QKD key and wavelength information for correctness to decide whether to use it locally or to forward it to a next node in the loop.

8. An optical network comprising:
   a plurality of nodes connected to each other in a loop with a single mode optical fiber;
   a first node configured to transmit optical signals in first and second wavelength channels on the optical fiber along with first and second quantum key distribution (QKD) keys to a second one of the plurality of nodes;
   the second node being configured to receive the first and second wavelength channels and the first and second QKD keys and to drop the first wavelength channel and the first QKD key and to regenerate the second QKD key for transmission to a third node in the loop;
   the third node being configured to drop the second QKD key and the second wavelength channel.

9. The optical network of claim 8, wherein the first node is configured to assign one of the first and second QKD keys to a corresponding one of the first and second wavelength channels, and the first node is configured to transmit QKD key and wavelength information pertaining to assignment of QKD keys to wavelength channels in an optical service channel, and wherein the second node receives the QKD key and wavelength information, evaluates the QKD key and wavelength information for correctness to decide whether to use it locally or to forward it to a next node in the loop.

10. A method comprising:
    in an optical network comprising a plurality of nodes connected to each other in a loop with a single mode optical fiber;
    transmitting optical signals from a first node in first and second wavelength channels on the optical fiber together with first and second quantum key distribution (QKD) keys to a second node;
    receiving the first and second wavelength channels at a second node together with the first and second QKD keys;
    at the second node, dropping the first wavelength channel and the first QKD key at the second node and regenerating the second QKD key;
    transmitting the second wavelength channel and the second QKD key from the second node to a third node; and
    receiving the second QKD key at the third node and dropping the second QKD key and the second wavelength channel at the third node.

11. The method of claim 10, where at the first node, further comprising assigning one of the first and second QKD keys to a corresponding one of the first and second wavelength channels, and wherein transmitting from the first node comprises transmitting QKD key and wavelength information pertaining to QKD key and wavelength assignment via an optical service channel over the single mode optical fiber, and wherein at the second node, further comprising receiving the QKD key and wavelength information and evaluating the QKD key and wavelength information for correctness to decide whether to use it locally or to forward it to a next node in the loop.

* * * * *